United States Patent
Mitsuta et al.

(10) Patent No.: US 10,581,091 B2
(45) Date of Patent: Mar. 3, 2020

(54) RESIN-FRAMED MEMBRANE ELECTRODE ASSEMBLY

(71) Applicant: HONDA MOTOR CO., LTD., Tokyo (JP)

(72) Inventors: Naoki Mitsuta, Wako (JP); Hiroshi Sohma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 516 days.

(21) Appl. No.: 14/583,096

(22) Filed: Dec. 25, 2014

(65) Prior Publication Data
US 2015/0188152 A1    Jul. 2, 2015

(30) Foreign Application Priority Data
Dec. 26, 2013 (JP) .................................. 2013-270116

(51) Int. Cl.
*H01M 8/0273* (2016.01)
*H01M 8/1004* (2016.01)
(Continued)

(52) U.S. Cl.
CPC ....... *H01M 8/0273* (2013.01); *H01M 8/0258* (2013.01); *H01M 8/0263* (2013.01);
(Continued)

(58) Field of Classification Search
CPC ............. H01M 8/0271; H01M 8/0273; H01M 8/0276; H01M 8/0297; H01M 8/2483;
(Continued)

(56) References Cited

U.S. PATENT DOCUMENTS 8,895,202 B2    11/2014 Tanaka et al.
2002/0027073 A1*    3/2002 Dristy ..................... C25B 9/066
                                                           204/409
(Continued)

FOREIGN PATENT DOCUMENTS

JP          2007-066766           3/2007
JP        2009181951 A   *       8/2009
(Continued)

OTHER PUBLICATIONS

English Translation of JP-2009181951-A (Year: 2009).*
(Continued)

*Primary Examiner* — Milton I Cano
*Assistant Examiner* — Philip A. Stuckey
(74) *Attorney, Agent, or Firm* — Mori & Ward, LLP (57) ABSTRACT

A resin-framed membrane electrode assembly includes a membrane electrode assembly, a resin frame, and a clearance. The membrane electrode assembly includes an electrolyte membrane, a first electrode, a second electrode, and a step. The first electrode is located on a first surface of the electrolyte membrane and includes a first catalyst layer and a first diffusion layer which are stacked on the first surface in a stacking direction. The resin frame is disposed outside the membrane electrode assembly. The clearance is provided between the resin frame and an outer edge surface of the first diffusion layer to be filled with a filler such that the filler reaches a level higher than a lower one of a height of the first diffusion layer or a height of the resin frame in cross section in the stacking direction.

18 Claims, 4 Drawing Sheets

(51) Int. Cl.
*H01M 8/242* (2016.01)
*H01M 8/0267* (2016.01)
*H01M 8/0263* (2016.01)
*H01M 8/2483* (2016.01)
*H01M 8/0258* (2016.01)
*H01M 8/1018* (2016.01)
*H01M 8/0276* (2016.01)

(52) U.S. Cl.
CPC ....... *H01M 8/0267* (2013.01); *H01M 8/1004* (2013.01); *H01M 8/242* (2013.01); *H01M 8/2483* (2016.02); *H01M 8/0276* (2013.01); *H01M 2008/1095* (2013.01); *H01M 2300/0082* (2013.01)

(58) Field of Classification Search
CPC .. H01M 8/0263; H01M 8/0267; H01M 8/242; H01M 8/0258; H01M 8/1004; H01M 2300/0082; H01M 2008/1095
See application file for complete search history.

(56) References Cited

U.S. PATENT DOCUMENTS

| | | | | |
|---|---|---|---|---|
| 2004/0224190 A1* | 11/2004 | Sasahara et al. | ... | H01M 8/0221 429/513 |
| 2008/0118802 A1* | 5/2008 | Szrama | ............... | H01M 4/8892 429/483 |
| 2010/0248087 A1* | 9/2010 | Tsuji | ................... | B29C 45/1671 429/535 |
| 2011/0136038 A1* | 6/2011 | Ishida | ................ | H01M 8/0273 429/480 |
| 2013/0157175 A1* | 6/2013 | Sohma | .................... | H01M 8/10 429/535 |
| 2013/0177832 A1* | 7/2013 | Tsubosaka | .......... | H01M 8/0271 429/480 |
| 2014/0004442 A1* | 1/2014 | Mitsuta | ............... | H01M 8/1004 429/481 |
| 2016/0285119 A1* | 9/2016 | Hayashi | ............. | H01M 8/1004 |

FOREIGN PATENT DOCUMENTS

| | | | |
|---|---|---|---|
| JP | 2013-098155 | 5/2013 | |
| JP | 2013-131417 | 7/2013 | |
| JP | 2013-239316 | 11/2013 | |
| JP | 2013-258096 | 12/2013 | |
| WO | WO 2008/001755 | 1/2008 | |
| WO | WO-2015087477 A1 * | 6/2015 | .......... H01M 8/1004 |

OTHER PUBLICATIONS

Japanese Office Action for corresponding JP Application No. 2013-270116, dated Sep. 13, 2016 (w/ English machine translation).

* cited by examiner

RESIN-FRAMED MEMBRANE ELECTRODE ASSEMBLY

CROSS-REFERENCE TO RELATED APPLICATIONS

The present application claims priority under 35 U.S.C. § 119 to Japanese Patent Application No. 2013-270116, filed Dec. 26, 2013, entitled "Resin-framed Membrane Electrode Assembly." The contents of this application are incorporated herein by reference in their entirety.

BACKGROUND

1. Field

The present disclosure relates to a resin-framed membrane electrode assembly.

2. Description of the Related Art

Fuel cells that cause electrochemical reaction of reactant gas so as to generate electric power have attracted attention as new power sources for recent automobiles. The fuel cells directly obtain electricity through electrochemical reaction, and thus, are considered preferable in view of high power generation efficiency. In addition, fuel cells generate only harmless water during electric power generation, and thus, are also considered preferable in view of environmental effects.

A solid polymer electrolyte fuel cell, for example, has a stack structure in which several tens to several hundreds of cells are stacked. In each cell, a membrane electrode assembly (MEA) is held between a pair of separators. The membrane electrode assembly includes an anode (a negative electrode), a cathode (a positive electrode), and an electrolyte membrane held between the anode and the cathode. Each of the anode and the cathode includes a catalyst layer that is in contact with the electrolyte membrane and a diffusion layer that is in contact with the catalyst layer. The separator has one surface provided with a fuel gas channel and another surface provided with an oxidizing agent gas channel.

In the solid polymer electrolyte fuel cell with the configuration as described above, hydrogen serving as fuel gas is supplied to the anode through the fuel gas channel. In addition, air serving as oxidizing agent gas is supplied to the cathode through the oxidizing agent gas channel. Then, hydrogen supplied to the anode is protonated on the catalyst layer and the generated protons move to the cathode through the electrolyte membrane. At this time, electrons generated together with protons are taken to an external circuit and used as electric energy.

In another type of a known membrane electrode assembly, the planar size of the diffusion layer of one electrode is smaller than that of the diffusion layer of the other electrode, and thereby, a step is formed in the outer peripheral edge. In this membrane electrode assembly, the planar size of the electrolyte membrane is equal to that of the diffusion layer of the other electrode, and thus, the electrolyte membrane in the outer peripheral edge is not held between these diffusion layers. In view of this, to protect the assembly mechanically and chemically, a configuration in which the outer peripheral edge of an exposed part of the electrolyte membrane is protected with a resin frame of, for example, a resin molding element and a resin film is proposed (see, for example, Japanese Unexamined Patent Application Publication No. 2007-66766).

In this configuration, when an inner edge of the resin frame is disposed between the electrolyte membrane and the diffusion layer, a load is concentrated on the inner edge of the resin frame because of a contact pressure generally applied to the membrane electrode assembly. Consequently, the electrolyte membrane is pressed and has its thickness reduced, resulting in deterioration of power generation performance. To prevent this deterioration, the inner edge of the resin frame needs to be located outside the diffusion layer. In this case, however, a clearance occurs between the inner edge of the resin frame and the outer edge of the diffusion layer so that the exposed part of the outer peripheral edge of the electrolyte membrane cannot be sufficiently protected. Thus, a configuration in which a filler such as an adhesive is provided in the clearance between the inner edge of the resin frame and the outer edge of the diffusion layer has been employed.

SUMMARY

According to one aspect of the present invention, a resin-framed membrane electrode assembly includes a membrane electrode assembly and a resin frame. The membrane electrode assembly includes an electrolyte membrane, a first electrode located on a surface of the electrolyte membrane and including a stack of a first catalyst layer and a first diffusion layer, and a second electrode located on another surface of the electrolyte membrane and including a stack of a second catalyst layer and a second diffusion layer, and has a step in an outer peripheral edge portion of the membrane electrode assembly formed by a size difference in which a planar size of the first diffusion layer is smaller than a planar size of the second diffusion layer. The resin frame is disposed outside the membrane electrode assembly. A clearance between the resin frame and an outer edge surface of the first diffusion layer is filled with a filler such that the filler reaches a level higher than a lower one of a height of the first diffusion layer or a height of the resin frame in cross section in a stacking direction.

According to another aspect of the present invention, a resin-framed membrane electrode assembly includes a membrane electrode assembly, a resin frame, and a clearance. The membrane electrode assembly includes an electrolyte membrane, a first electrode, a second electrode, and a step. The first electrode is located on a first surface of the electrolyte membrane and includes a first catalyst layer and a first diffusion layer which are stacked on the first surface in a stacking direction. The second electrode is located on a second surface of the electrolyte membrane opposite to the first surface in the stacking direction and includes a second catalyst layer and a second diffusion layer which are stacked on the second surface in the stacking direction. A planar size of the first diffusion layer is smaller than a planar size of the second diffusion layer. The step is provided at an outer peripheral edge portion of the membrane electrode assembly between the first diffusion layer and the second diffusion layer due to a size difference between the planar size of the first diffusion layer and the planar size of the second diffusion layer. The resin frame is disposed outside the membrane electrode assembly. The clearance is provided between the resin frame and an outer edge surface of the first diffusion layer to be filled with a filler such that the filler reaches a level higher than a lower one of a height of the first diffusion layer or a height of the resin frame in cross section in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

An embodiment of the present disclosure will be described in detail with reference to the drawings.

Figure 1:
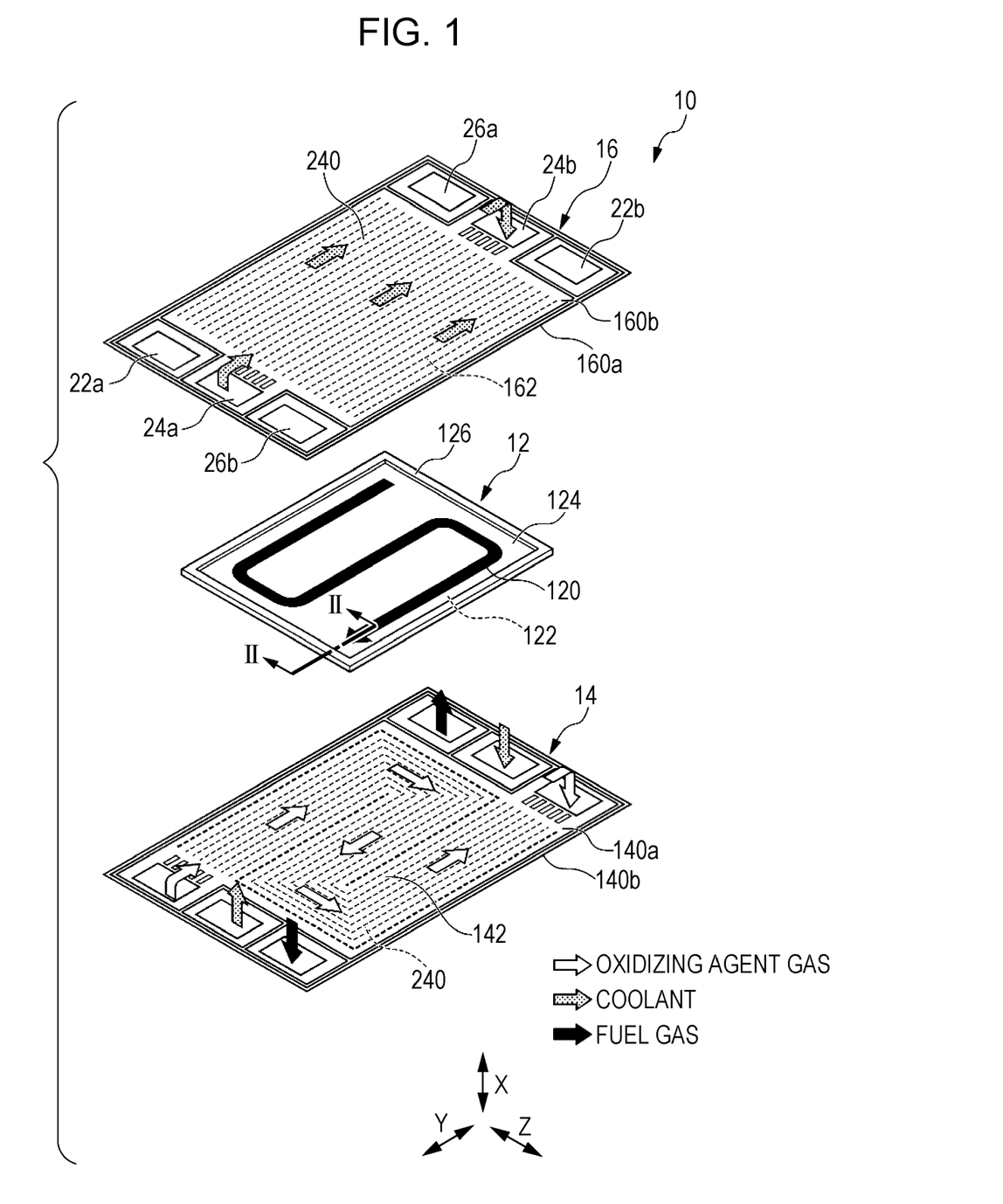
FIG. 1 is an exploded perspective view illustrating a power generation cell including a resin-framed membrane electrode assembly according to an embodiment of the present disclosure.

FIG. 1 is an exploded perspective view illustrating a power generation cell 10 including a resin-framed membrane electrode assembly 12 according to an embodiment of the present disclosure. A plurality of power generation cells 10 are stacked vertically with their electrode surfaces oriented horizontally, and constitute a fuel cell stack. A predetermined clamping load is applied to the stacked power generation cells 10, and thus, a predetermined contact pressure is applied to the electrode surfaces of the power generation cells 10.

As illustrated in FIG. 1, each of the power generation cells 10 includes the resin-framed membrane electrode assembly 12 and a pair of a first separator 16 and a second separator 14 sandwiching the resin-framed membrane electrode assembly 12.

At an end of the power generation cell 10 along the longitudinal axis (i.e., a Y axis in FIG. 1), an oxidizing agent gas inlet manifold 22a, a coolant inlet manifold 24a, and a fuel gas outlet manifold 26b are provided and penetrate through the power generation cell 10 along the thickness thereof (i.e., an X axis in FIG. 1). At the other end of the power generation cell 10 along the Y axis, a fuel gas inlet manifold 26a, a coolant outlet manifold 24b, and an oxidizing agent gas outlet manifold 22b are provided and penetrate the power generation cell 10 along the X axis.

The first separator 16 and the second separator 14 are carbon separators. Each of these separators is produced by cutting a carbon thin plate. Alternatively, the first separator 16 and the second separator 14 may be metal separators.

As illustrated in FIG. 1, a surface 140a of the second separator 14 facing the membrane electrode assembly 12 is provided with an oxidizing agent gas channel 142 communicating with the oxidizing agent gas inlet manifold 22a and the oxidizing agent gas outlet manifold 22b. The oxidizing agent gas channel 142 has a plurality of oxidizing agent gas channel grooves. The oxidizing agent gas channel grooves extend along a Z axis while meandering along the Y axis, thereby forming an S-shaped serpentine channel that turns once and a half along the Y axis. The serpentine channel may be a serpentine channel that has two and a half turns, for example.

A surface 160a of the first separator 16 facing the membrane electrode assembly 12 is provided with a fuel gas channel 162 communicating with the fuel gas inlet manifold 26a and the fuel gas outlet manifold 26b. The fuel gas channel 162 has a plurality of fuel gas channel grooves. The fuel gas channel grooves extend along the Z axis while meandering along the Y axis, thereby forming an S-shaped serpentine channel that has one and a half turns along the Y axis. Similarly to the oxidizing agent gas channel 142, the serpentine channel may be a serpentine channel that turns two and a half turns, for example. The fuel gas channel 162 and the oxidizing agent gas channel 142 are not limited to serpentine channels, and may be linear channels.

As described above, in the stack of the power generation cells 10, the first separator 16 and the second separator 14 overlap and form one body. Thus, a surface 140b of the second separator 14 opposite to the surface 140a of the second separator 14 and a surface 160b of the first separator 16 opposite to the surface 160a of the first separator 16 enclose coolant channels 240 therebetween. The coolant channels 240 individually extend along the Y axis.

As illustrated in FIG. 1, in the surfaces 140a and 140b of the second separator 14, a sealing member is integrally formed around the outer periphery of the second separator 14. Similarly, in the surfaces 160a and 160b of the first separator 16, a sealing member is integrally formed around the outer periphery of the first separator 16. The sealing member is made of, for example, a sealing material such as ethylene propylene diene rubber (EPDM), nitrile butadiene rubber (NBR), fluorine rubber, silicone rubber, fluorosilicone rubber, butyl rubber, natural rubber, styrene rubber, chloroprene rubber, or acrylic rubber; or an elastic sealing material such as a cushioning material or a gasket material.

The resin-framed membrane electrode assembly 12 includes a membrane electrode assembly 125 and a resin frame 126 located outside the membrane electrode assembly 125, more specifically, around the outer periphery of the membrane electrode assembly 125 to form a frame shape. The membrane electrode assembly 125 includes a solid polymer electrolyte membrane 120 of, for example, perfluorosulfonic acid, a cathode 122, and an anode 124. The cathode 122 and the anode 124 sandwich the solid polymer electrolyte membrane 120.

Each of the cathode 122 and the anode 124 includes a diffusion layer of carbon paper containing carbon fibers and a catalyst layer formed by applying porous carbon particles carrying a platinum alloy on its surface onto the diffusion layer. The cathode 122 and the anode 124 are stacked on the solid polymer electrolyte membrane 120 such that the gas diffusion layers facing outside and the catalyst layers are in contact with the solid polymer electrolyte membrane 120.

Figure 2:
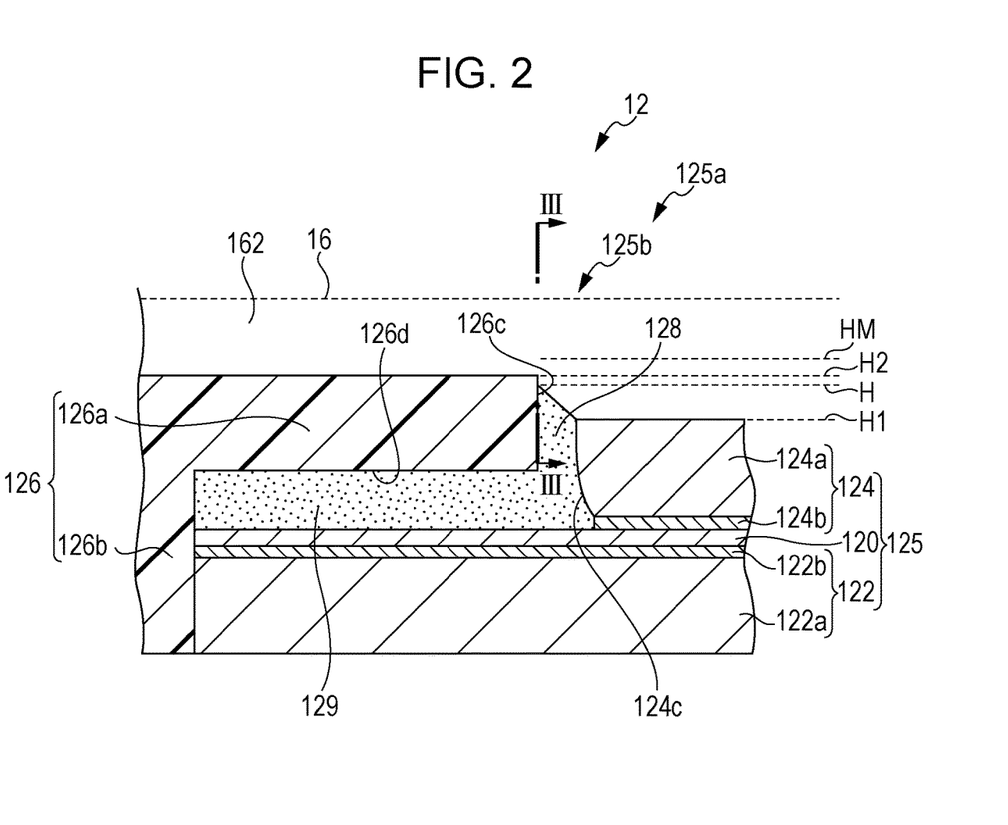
FIG. 2 is a cross-sectional view illustrating an outer peripheral edge portion of the resin-framed membrane electrode assembly of the embodiment.

FIG. 2 is a cross-sectional view illustrating an outer peripheral edge portion of the resin-framed membrane electrode assembly 12 of this embodiment. Specifically, FIG. 2 illustrates a cross section taken along line II-II in FIG. 1, and outer peripheral edge portions of the resin-framed membrane electrode assembly 12 basically have the same structure.

As illustrated in FIG. 2, the cathode 122 includes a cathode diffusion layer 122a and a cathode catalyst layer 122b, and the anode 124 includes an anode diffusion layer 124a and an anode catalyst layer 124b. Each of the cathode 122 and the anode 124 may include an underlying layer containing, for example, carbon and fluorine resin between the diffusion layer and the cathode 122 or the anode 124.

As illustrated in FIG. 2, the planar size of the anode diffusion layer 124a is smaller than that of the cathode diffusion layer 122a. Thus, a step 125b is formed in a part of the outer peripheral edge portion 125a of the membrane electrode assembly 125 facing the anode 124. The present disclosure, however, is not limited to this configuration, and the planar size of the anode diffusion layer may be larger than that of the cathode diffusion layer. In this case, the step is formed in a part of the outer peripheral edge portion facing the cathode 122.

The planar sizes of the solid polymer electrolyte membrane 120 and the cathode catalyst layer 122b are equal to that of the cathode diffusion layer 122a. On the other hand, the planar size of the anode catalyst layer 124b is approximately equal to that of the anode diffusion layer 124a. Thus, before the resin frame 126 and a filler 128, which will be described later, are provided, in a part of the outer peripheral edge portion 125a of the membrane electrode assembly 125 facing the anode 124, the solid polymer electrolyte membrane 120 is not held between the diffusion layers and is exposed. More specifically, the solid polymer electrolyte membrane 120 is exposed to the outside in the entire periphery thereof.

As illustrated in FIG. 2, an outer edge surface 124c of the anode diffusion layer 124a is approximately arc shaped in cross section taken along the direction in which the power generation cells 10 are stacked. More specifically, in cross section taken in the stacking direction, the outer edge surface 124c of the anode diffusion layer 124a is curved toward the center (i.e., toward the right in FIG. 2) of the membrane electrode assembly 125 when seen toward the anode catalyst layer 124b.

The resin frame 126 has an L shape in cross section as illustrated in FIG. 2. The resin frame 126 includes a resin frame projection 126a and a resin frame body 126b. The resin frame projection 126a projects from the entire periphery of the resin frame 126 toward the outer edge surface 124c of the anode diffusion layer 124a close to the anode 124 having the step 125b. The thickness of the resin frame projection 126a is approximately equal to those of the anode diffusion layer 124a and the cathode diffusion layer 122a.

The resin frame body 126b has a rectangular frame shape and constitutes a base of the resin frame 126. The inner wall surface of the resin frame body 126b is in contact with the outer edge surfaces of the cathode diffusion layer 122a, the cathode catalyst layer 122b, the solid polymer electrolyte membrane 120, and the anode diffusion layer 124a.

The resin frame projection 126a and the resin frame body 126b are integrally formed. The total thickness of the resin frame projection 126a and the resin frame body 126b is approximately equal to the thickness of the membrane electrode assembly 125.

The type of resin constituting the resin frame 126 is not specifically limited. Examples of a resin constituting the resin frame 126 include polyphenylene sulfide (PPS), polyphthalamide (PPA), polyethylene naphthalate (PEN), polyether sulfone (PES), liquid crystal polymer (LCP), polyvinylidene fluoride (PVDF), polyethylene terephthalate (PET), polybutene terephthalate (PBT), polypropylene (PP), syndiotactic polystyrene (SPS), silicone rubber, fluorine rubber, and ethylene propylene (EPDM) rubber.

An adhesive layer 129 is provided between a lower surface 126d of the resin frame projection 126a and the anode catalyst layer 124b. The adhesive layer 129 has a flame shape extending along the entire periphery of the outer peripheral edge portion 125a of the membrane electrode assembly 125. That is, the resin frame projection 126a and the anode catalyst layer 124b are bonded and fixed together by the adhesive layer 129.

The adhesive layer 129 may be formed by using one or more of adhesives including acrylic adhesives, olefin-based adhesives, silicone-based adhesives, fluorine-based adhesives, epoxy-based adhesives, and urethane-based adhesives, for example. The adhesive layer 129 may be formed by using one or more of adhesives including natural rubber, isoprene rubber, butadiene rubber, acrylic rubber, EPDM rubber, fluorine rubber, silicone rubber, and elastomer, and also using a varnish obtained by dissolving a resin in a solvent.

A filler 128 fills a clearance between an inner edge surface 126c of the resin frame projection 126a and the outer edge surface 124c of the anode diffusion layer 124a. The filler 128 may be continuously integrated with the adhesive layer 129, or may be made of an adhesive constituting the adhesive layer 129. The filler 128 may be a known filler, which is different from the material for the adhesive layer 129. The filler 128 enables the resin frame 126 not to be easily detached. The filler 128 is preferably in a liquid form when filling the clearance. The filler 128 may be applied after joining the membrane electrode assembly 125 and the resin frame 126 or before the joining.

In this embodiment, the filler 128 reaches a level higher than a height H1 of the upper surface of the anode diffusion layer 124a in cross section taken in the stacking direction in FIG. 2. More specifically, the filler 128 is inclined upward from the level of the height H1 of the anode diffusion layer 124a toward the outer periphery (i.e., toward the left in FIG. 2). The filling height of the filler 128 in a portion thereof in contact with the inner edge surface 126c of the resin frame projection 126a is at the highest level H.

The filling height of the filler 128 herein is a height H at the highest level.

In this embodiment, the filling height H of the filler 128 is lower than a height H2 of the upper surface of the resin frame 126. However, the present disclosure is not limited to this. For example, the filler 128 may fill the clearance to a level higher than the height H2 of the resin frame 126. In this case, however, the filling height H of the filler 128 is preferably less than or equal to a predetermined maximum height HM. This predetermined maximum height HM is defined such that the ratio of the area of the filler 128 to the cross-sectional area of each of the fuel gas channels 162 is 25% or less in a cross section orthogonal to a flow direction of the fuel gas channel 162.

This configuration is not limited to the fuel gas channels 162 and is also applicable to the case of the oxidizing agent gas channel 142.

Figure 3:
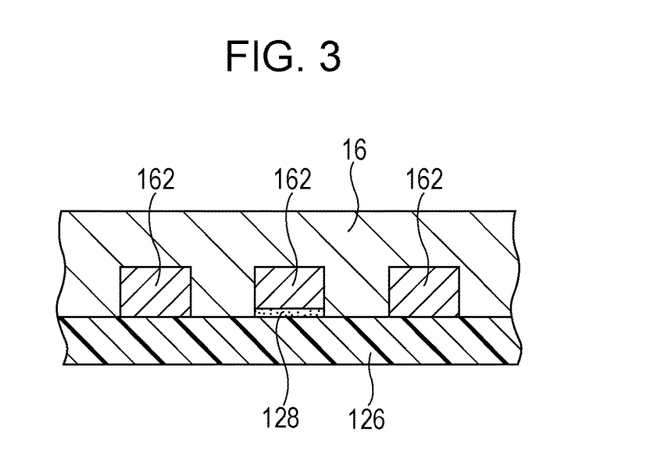
FIG. 3 is a cross-sectional view illustrating a fuel gas channel in the power generation cell.

FIG. 3 is a cross-sectional view illustrating the fuel gas channel 162 of the power generation cell 10 of this embodiment. Specifically, FIG. 3 is a cross-sectional view taken along line in FIG. 2.

As illustrated in FIG. 3, in a case where the filling height H of the filler 128 is higher than the height H2 of the resin frame 126, i.e., the filler 128 fills the clearance to a level higher than the height H2 of the resin frame 126, the filler 128 is extruded into the fuel gas channels 162 so that the channels become narrow. When the channels become narrow to some degree or more, it becomes difficult to release generated water and fuel gas does not flow easily. At the same time, there is an increase in the pressure drop of fuel gas. When the fuel gas pressure increases to a predetermined degree, water starts being released, and fuel gas flows during this release. This process is repeatedly performed so that the flow rate of fuel gas varies, resulting in an increase in voltage variation range and deterioration of power generation performance.

Specifically, in cross section illustrated in FIG. 3, when the ratio of the area of the filler 128 to the cross-sectional area of the fuel gas channel 162 exceeds 25%, the above-described phenomenon occurs, resulting in an increase in voltage variation range and deterioration of power generation performance. Thus, in the cross section illustrated in FIG. 3, the filling height H of the filler 128 is preferably a height HM such that the ratio of the area of the filler 128 to the cross-sectional area of the fuel gas channel 162 is 25% or less. The cross-sectional area of the fuel gas channel 162 herein refers to a cross-sectional area of one of the adjacent fuel gas channels 162. The area of the filler 128 herein refers to an extrusion area of the filler 128 in one channel. That is, when the percentage of the extrusion area of the filler 128 to the channel cross-sectional area exceeds 25% in at least one of the fuel gas channels 162, the voltage variation range increases, and power generation performance deteriorates.

For example, in the cross section illustrated in FIG. 3, suppose the cross-sectional area of the fuel gas channel 162 is 0.5 mm$^2$, i.e., 0.5 mm in height×1.0 mm in width=0.5 mm$^2$. In this case, if the extrusion height of the filler 128 in one of the fuel gas channels 162 is 0.1 mm, the extrusion area of the filler 128 is 0.1 mm×1.0 mm=0.1 mm$^2$. Thus, the ratio of the extrusion area of the filler 128 to the cross-sectional area of the fuel gas channel 162 is 0.1 mm$^2$/0.5 mm$^2$×100=20%.

Figure 4:
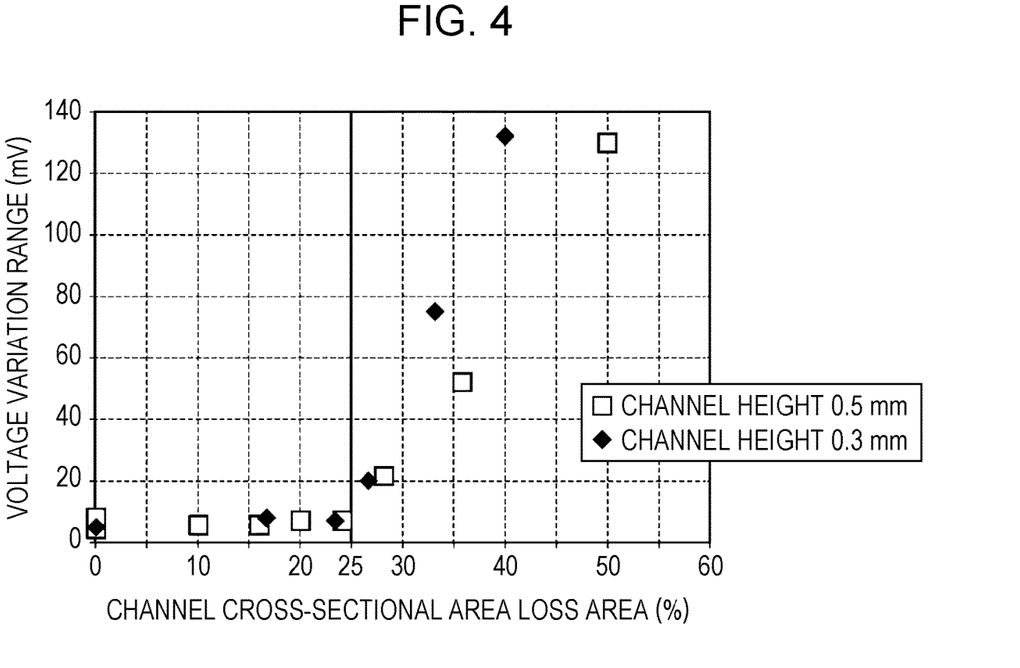
FIG. 4 is a graph showing a relationship between a gas channel cross-sectional area and a voltage variation range with a variation in the height of the gas channel.

Here, the relationship between the gas channel and the extrusion area of the filler shows a similar tendency, independently of the height of the gas channel. FIG. 4 is a graph showing a relationship between the cross-sectional area of a gas channel and the voltage variation range with a variation in height of the gas channel. More specifically, FIG. 4 shows a relationship between the loss area % of the cross-sectional area of the gas channel caused by extrusion of the filler and the voltage variation range in cases where the height of a gas channel is 0.3 mm and 0.5 mm.

The voltage variation range shown in FIG. 4 is the maximum value of a voltage variation range when a power generation cell continuously generated electric power in a constant amount of 0.3 A/cm$^2$ for 30 minutes under the condition where the cell temperature was 70° C., a humidified atmosphere was anode/cathode =85%/85% Rh, the gas flow rate is the stoichiometry was 1.5/1.5, and the gas pressure was anode/cathode =50/50 kPa.

As illustrated in FIG. 4, even with different heights of the channels, when the loss area % of the cross-sectional area of each channel exceeds 25%, the voltage variation range abruptly increases. This results show that the filling height H of the filler 128 is preferably the height HM at which the ratio of the area of the filler 128 to the cross-sectional area of the fuel gas channel 162 is less than or equal to 25%. The same holds true for the fuel gas channel and the oxidizing agent gas channel regarding the gas channels.

The resin-framed membrane electrode assembly 12 of this embodiment with the foregoing configuration is configured in, for example, the following manner.

First, a membrane electrode assembly 125 in which a step 125b is formed in an outer peripheral edge portion 125a is prepared. Specifically, a binder solution is added to a mixture of an anode catalyst or a cathode catalyst and a solvent so as to obtain a predetermined ink viscosity, thereby preparing anode ink and cathode ink.

Next, the anode/cathode ink is applied to a PET sheet of a PET film by screen printing, thereby preparing an anode sheet and a cathode sheet.

Then, a solid polymer electrolyte membrane 120 is sandwiched between the anode and cathode sheets and are hot pressed. Thereafter, the PET sheet is peeled off, thereby forming an anode catalyst layer 124b on one surface of the solid polymer electrolyte membrane 120 and a cathode catalyst layer 122b on the other surface of the solid polymer electrolyte membrane 120.

Subsequently, slurry in which carbon black and polytetrafluoroethylene (PTFE) particles are uniformly dispersed is prepared. The prepared slurry is applied onto carbon paper and is dried, thereby forming an anode diffusion layer 124a and a cathode diffusion layer 122a each composed of carbon paper and an underlying layer. In this process, the planar size of the anode diffusion layer 124a is smaller than that of the cathode diffusion layer 122a in both vertical and horizontal dimensions. The planar size of the cathode diffusion layer 122a is equal to that of the solid polymer electrolyte membrane 120.

Then, the anode diffusion layer 124a is disposed on a side of the solid polymer electrolyte membrane 120 where the anode catalyst layer 124b is formed, and the cathode diffusion layer 122a is disposed on the other side of the solid polymer electrolyte membrane 120 where the cathode diffusion layer 122a is formed, and these members are hot pressed in this state. In this manner, a membrane electrode assembly 125 in which a step 125b is formed in an outer peripheral edge portion 125a is prepared.

On the other hand, a resin frame 126 is previously molded by injection molding using a die. Specifically, a resin frame 126 including a resin frame body 126b with a rectangular ring shape and a resin frame projection 126a projecting inward from an upper portion of the resin frame body 126b is molded by injection molding using a die.

Next, with the resin frame 126 oriented upside down, an adhesive TB1220G produced by ThreeBond Co., Ltd., for example, is applied to a lower surface 126d and an inner edge surface 126c of the resin frame projection 126a to a predetermined width and a predetermined thickness with a commercially available dispenser (e.g., a dispenser ML-606GX produced by Musashi engineering Co., Ltd.). In this process, the adhesive is applied so as to be in contact with the outer edge surface 124c of the anode diffusion layer 124a having a small planar size.

Then, a membrane electrode assembly 125 is formed such that outer edge surfaces of a cathode diffusion layer 122a, a cathode catalyst layer 122b, a solid polymer electrolyte membrane 120, and an anode catalyst layer 124b are brought into contact with an inner wall of the resin frame body 126b, and an outer peripheral edge portion 125a of the membrane electrode assembly 125 provided with a step 125b faces the lower surface of the resin frame projection 126a. Then, a flat plate is placed on the membrane electrode assembly 125 and a weight of 5 kg is applied thereto with a PTFE sheet interposed therebetween, and the membrane electrode assembly 125 is bonded and cured at 120° C. for 120 minutes. In this manner, a resin-framed membrane electrode assembly 12 is obtained.

A clearance between the resin frame 126 and the anode diffusion layer 124a with a small planar size in the resin-framed membrane electrode assembly 12 is filled with a filler SIFEL2661 produced by Shin-Etsu Chemical Co., Ltd., for example, with a commercially available dispenser (e.g., a dispenser ML-606GX produced by Musashi engineering Co., Ltd.) with image recognition with an image recognizing unit (e.g., a 350PC produced by Musashi engineering Co., Ltd.) so that the filter has a predetermined thickness.

After the filling, the filer is dried at 120° C. for eight hours, for example, and then the height of the filler is measured with a microscope (e.g., a laser microscope VK-X200 produced by Keyence Corporation). Based on the measured value, the height of the filler is adjusted. The height of the filler is adjusted by adjusting application conditions (e.g., the discharge rate and the application speed) of the dispenser.

Then, the thus-obtained resin-framed membrane electrode assembly 12 is held between a first separator 16 and a second separator 14 each constituted by a carbon separator, thereby forming a power generation cell 10. These carbon separators are subjected to surface cutting so that serpentine channels are formed. The widths of the groove and the crests are 1 mm, for example. The height of the channels is 0.5 mm or 0.3 mm, for example. These separators are disposed on both the surfaces of the resin-framed membrane electrode assembly 12 so that the resin-framed membrane electrode assembly 12 is sandwiched therebetween.

In the foregoing manner, the power generation cell 10 including the resin-framed membrane electrode assembly 12 of this embodiment is fabricated, and the power generation cells 10 are stacked, thereby forming a fuel cell stack.

The fuel cell stack including the resin-framed membrane electrode assembly 12 of this embodiment operates in the following manner.

Referring back to FIG. 1, oxidizing agent gas is first supplied from an oxidizing agent gas supply unit, not shown, to the fuel cell stack. Then, the supplied oxidizing agent gas flows from the oxidizing agent gas inlet manifold 22a into the oxidizing agent gas channel 142 formed between the solid polymer electrolyte membrane 120 and the second separator 14. In this manner, oxidizing agent gas is supplied to the cathode 122.

At this time, a fuel gas supply unit, not shown, supplies fuel gas to the fuel cell stack. Then, the supplied fuel gas flows through the fuel gas inlet manifold 26a into the fuel gas channel 162 formed between the solid polymer electrolyte membrane 120 and the first separator 16. In this manner, fuel gas is supplied to the anode 124.

At this time, a coolant supply unit, not shown, supplies a coolant to, the fuel cell stack. Then, the supplied coolant flows through the coolant inlet manifold 24a into the coolant channels 240 formed between the first separator 16 and the second separator 14.

In the membrane electrode assembly 12, an electrochemical reaction between the oxidizing agent gas supplied to the cathode 122 and the fuel gas supplied to the anode 124 progresses, thereby generating electric power. The membrane electrode assembly 12 heated by electric power generation is cooled by the coolant flowing in the coolant channels 240.

Thereafter, the oxidizing agent gas supplied to and consumed in the cathode 122 is released through the oxidizing agent gas outlet manifold 22b, and the fuel gas supplied to and consumed in the anode 124 is released through the fuel gas outlet manifold 26b. The coolant used for cooling the membrane electrode assembly 12 is released through the coolant outlet manifold 24b.

This embodiment can provide the following advantages.

In this embodiment, in the resin-framed membrane electrode assembly 12 in which the step 125b is formed in the outer peripheral edge portion 125a, the clearance between the resin frame 126 and the outer edge surface 124c of the anode diffusion layer 124a is filled with the filler 128. At this time, the filling height H of the filler 128 is larger than a lower one, i.e., the height H1, of the height H1 of the anode diffusion layer 124a or the height H2 of the resin frame 126 in cross section in the stacking direction.

Thus, an excessively small thickness of the filler 128 can be avoided so that a quality test on, for example, the thickness of the filler 128 can be easily performed at low cost. In addition, the filler 128 can protect the outer peripheral edge portion 125a sufficiently so that high power generation performance is obtained. Further, in the case of using an adhesive for the filler 128, the resin frame is not easily detached because of high adhesive power of the adhesive, thereby obtaining stable power generation performance.

In this embodiment, the filling height H of the filler 128 is larger than those of the anode diffusion layer 124a and the resin frame 126 in cross section in the stacking direction. In another cross section orthogonal to the direction of the fuel gas channel 162, the clearance is filled with the filler 128 such that the ratio of the area of the filler 128 to the cross-sectional area of the fuel gas channel 162 is less than or equal to 25%.

When the fuel gas channel 162 is narrowed to a predetermined width or narrower, the release of generated water becomes difficult so that fuel gas does not flow easily, and a pressure drop of fuel gas increases. When the fuel gas pressure increases to some degree, water starts being released, and at this point of time, the fuel gas flows. This phenomenon repeatedly occurs so that the fuel gas flow rate varies. Consequently, the voltage variation range increases, and power generation performance decreases.

On the other hand, in this embodiment, an excessively large thickness of the filler 128 can be avoided so that extrusion of the filler 128 into the fuel gas channel 162 is limited and a sufficiently large cross-sectional area of the fuel gas channel 162 is obtained. As a result, high power generation performance can be obtained with stability.

In addition, in this embodiment, the outer edge surface 124c of the anode diffusion layer 124a is approximately arc shaped in cross section in the stacking direction. Specifically, since the planar size of the outer edge surface 124c of the anode diffusion layer 124a is smaller than that of the cathode diffusion layer 122a, the outer edge surface 124c of the anode diffusion layer 124a that is in direct contact with the filler 128 is rounded so as to ease a contact of the filler 128 with the outer edge surface 124c of the anode diffusion layer 124a so that the clearance between the resin frame 126 and the outer edge surface 124c of the anode diffusion layer 124a can be sufficiently filled with the filler 128. A contact pressure generally applied to the membrane electrode assembly 125 can reduce a concentration of load on the outer peripheral edge portion of the anode diffusion layer 124a. Thus, the thickness is reduced by pressure of the solid polymer electrolyte membrane 120, thereby suppressing degradation of power generation performance.

The present disclosure is not limited to the foregoing embodiment, and may be changed or modified within the scope of the present disclosure.

In the above embodiment, the height H2 of the resin frame 126 is larger than the height H1 of the anode diffusion layer 124a. However, as in the case of using a resin film 127 as the resin frame 126, the present disclosure is also applicable to a configuration in which the height H2 of the resin frame 126 is smaller than the height H1 of the anode diffusion layer 124a.

Figure 5:
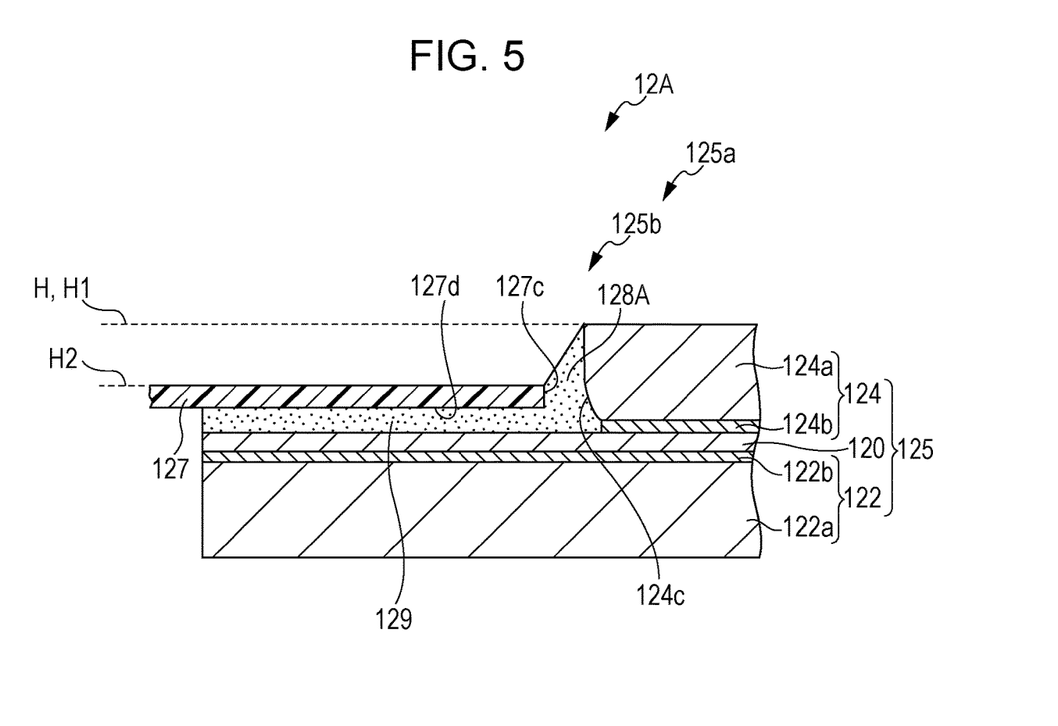
FIG. 5 is a cross-sectional view illustrating an outer peripheral edge portion of a resin-framed membrane electrode assembly according to a variation of the embodiment.

FIG. 5 is a cross-sectional view illustrating an outer peripheral edge portion 125a of a resin-framed membrane electrode assembly 12A according to a variation of the above embodiment. The resin-framed membrane electrode assembly 12A has a configuration similar to that of the resin-framed membrane electrode assembly 12 of the above embodiment except for that the resin film 127 is used instead of the resin frame 126. As illustrated in FIG. 5, in this variation, the resin film 127 is thin, and thus, the height H2 of the resin film 127 as the resin frame is smaller than the height Hi of the anode diffusion layer 124a. In this case, the filling height (i.e., the height of a highest portion as described above) H of a filler 128A is larger than the height H2 of the resin film 127 as the resin frame.

In FIG. 5, the filling height H of the filler 128A is equal to the height H1 of the anode diffusion layer 124a, but may be higher than the height H1 of the anode diffusion layer 124a. As in the above embodiment, the filling height H of the filler 128A in cross section is preferably defined such that the ratio of the area of the filler 128A to the cross-sectional area of each fuel gas channel is less than or equal to 25%. Thus, the voltage variation range can be reduced, and high power generation performance can be obtained with stability.

Figure 6:
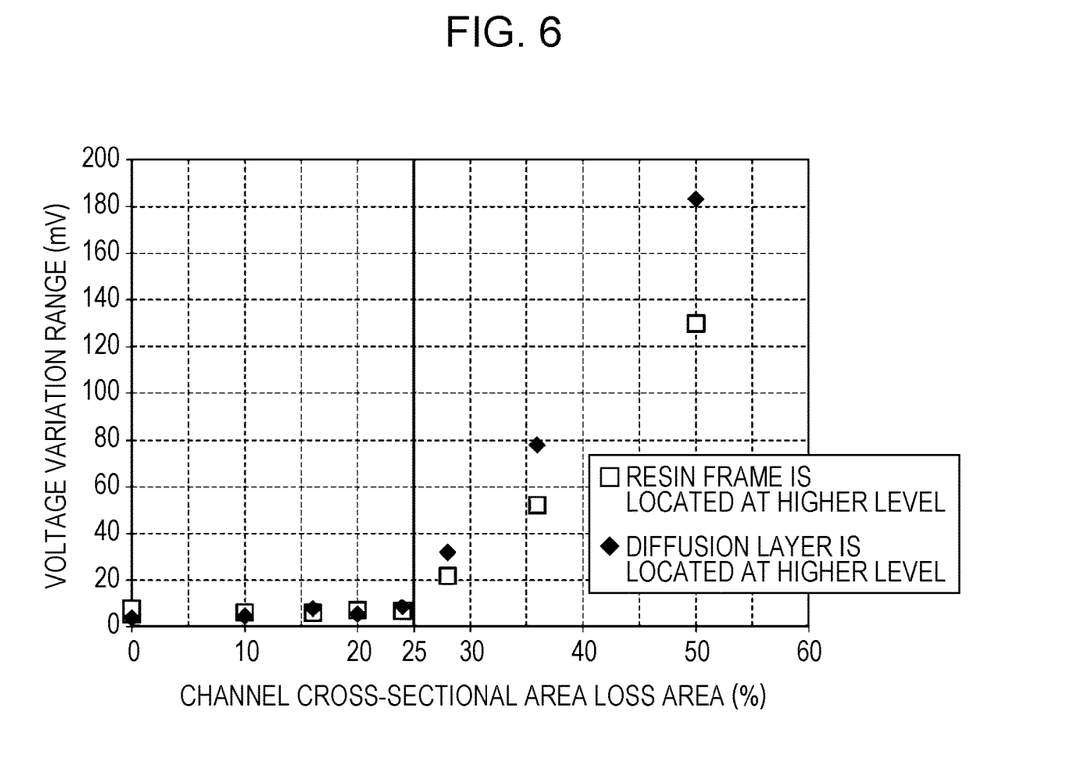
FIG. 6 is a graph showing a relationship between a gas channel cross-sectional area and a voltage variation range with variations in the height of a resin frame and the height of a diffusion layer.

FIG. 6 shows a relationship between the gas channel cross-sectional area and the voltage variation range with variations of heights of the resin frame and the diffusion layer. Specifically, the graph of FIG. 6 shows the relationship between the loss area % of the gas channel cross-sectional area caused by extrusion of the filler and the corresponding voltage variation range in each of a case where the resin frame 126 is located at a higher level than the anode diffusion layer 124a as described in the above embodiment and a case where the anode diffusion layer 124a is located at a higher level than the resin film 127 as the resin frame as described in this variation.

As shown in FIG. 6, in each of the cases, when the loss area % of the gas channel cross-sectional area caused by extrusion of the filler exceeds 25%, the voltage variation range abruptly increases. From the result shown in FIG. 6, irrespective of the height of the resin frame and the height of the diffusion layer, the filling height H of the filler in cross section is preferably defined such that the ratio of the area of the filler to the cross-sectional area of each fuel gas channel is less than or equal to 25%.

The present application describes a resin-framed membrane electrode assembly (e.g., a resin-framed membrane electrode assembly 12, which will be described later) including: a membrane electrode assembly (e.g., a membrane electrode assembly 125, which will be described later) including an electrolyte membrane (e.g., a solid polymer electrolyte membrane 120, which will be described later), a first electrode (e.g., an anode 124, which will be described later) located on a surface of the electrolyte membrane and including a stack of a first catalyst layer (e.g., an anode catalyst layer 124b, which will be described later) and a first diffusion layer (e.g., an anode diffusion layer 124a, which will be described later), and a second electrode (e.g., a cathode 122, which will be described later) located on another surface of the electrolyte membrane and including a stack of a second catalyst layer (e.g., a cathode catalyst layer 122b, which will be described later) and a second diffusion layer (e.g., a cathode diffusion layer 122a, which will be described later), and having a step (e.g., a step 125b, which will be described later) in an outer peripheral edge portion (e.g., an outer peripheral edge portion 125a, which will be described later) of the membrane electrode assembly formed by a size difference in which a planar size of the first diffusion layer is smaller than a planar size of the second diffusion layer; and a resin frame (e.g., a resin frame 126, which will be described later) disposed outside the membrane electrode assembly. In the resin-framed membrane electrode assembly, a clearance between the resin frame and an outer edge surface (e.g., an outer edge surface 124c, which will be described later) of the first diffusion layer is filled with a filler (e.g., a filler 128, which will be described later) such that the filler reaches a level higher than a lower one (e.g., a height H1, which will be described later) of a height (e.g., the height H1, which will be described later) of the first diffusion layer or a height (e.g., a height H2, which will be described later) of the resin frame in cross section in the stacking direction.

In the resin-framed membrane electrode assembly having the step in the outer peripheral edge portion thereof, the clearance between the resin frame and the outer edge surface of the first diffusion layer is filled with the filler. In addition, in cross section in the stacking direction, the filling height of the filler is higher than the lower one of the height of the first diffusion layer or the height of the resin frame.

This configuration can avoid an excessively small thickness of the filler, and thus, the quality, such as the thickness, of the filler can be easily evaluated at low cost, and the filler can sufficiently protect the outer peripheral edge portion. As a result, high power generation performance can be obtained. In the case of using an adhesive for the filler, the resin frame is not easily detached because of the high adhesive power of the adhesive, thereby obtaining stable power generation performance.

A separator (e.g., a first separator 16, which will be described later) having a groove forming a gas channel (e.g., a fuel gas channel 162, which will be described later) is stacked on the first diffusion layer, the filler reaches a level higher than each of the height of the first diffusion layer and the height of the resin frame in cross section in the stacking direction, and the ratio of the area of the filler to a cross-sectional area of the gas channel is less than or equal to 25% in a cross section orthogonal to the gas channel.

In this configuration, the filling height of the filler is higher than each of the height of the first diffusion layer and the height of the resin frame in cross section in the stacking direction. In addition, in cross section orthogonal to the gas channel direction, the clearance is filled with the filler such that the ratio of the area of the filler to the cross-sectional area of the gas channel is less than or equal to 25%.

When the gas channel is narrowed to a predetermined width or narrower, the release of generated water becomes difficult so that gas does not flow easily, and a pressure drop of the gas increases. When the gas pressure increases to some degree, water starts being released, and at this point in time, the gas flows. This phenomenon repeatedly occurs so that the gas flow rate varies. Consequently, the voltage variation range increases, and power generation performance degrades.

On the other hand, in the above configuration of the present disclosure, an excessively large thickness of the filler is avoided so that extrusion of the filler into the gas channel can be limited and a sufficiently large cross-sectional area of the gas channel is obtained. As a result, high power generation performance can be obtained with stability.

The outer edge surface (e.g., the outer edge surface 124c, which will be described later) of the first diffusion layer is approximately arc shaped in cross section in the stacking direction.

In this configuration, the outer edge surface of the first diffusion layer is approximately arc shaped in cross section in the stacking direction. Specifically, the outer edge surface of the first diffusion layer that is in direct contact with the electrolyte membrane because of a planar size smaller than that of the second diffusion layer is rounded so as to ease a contact of the filler with the outer edge surface of the first diffusion layer so that the clearance between the resin frame and the outer edge surface of the first diffusion layer can be sufficiently filled with the filler. A contact pressure generally applied to the membrane electrode assembly can reduce a concentration of load on the outer peripheral edge portion of the first diffusion layer. Thus, the thickness is reduced by pressure of the electrolyte membrane, thereby suppressing degradation of power generation performance.

A resin-framed membrane electrode assembly whose quality can be easily evaluated and which shows high power generation performance is provided.

Obviously, numerous modifications and variations of the present invention are possible in light of the above teachings. It is therefore to be understood that within the scope of the appended claims, the invention may be practiced otherwise than as specifically described herein.

What is claimed is:

1. A resin-framed membrane electrode assembly comprising:
    a membrane electrode assembly including
        an electrolyte membrane, a first electrode located on a first surface of the electrolyte membrane and including a stack of a first catalyst layer and a first diffusion layer stacked on the first surface in a first direction orthogonal to the first surface, and a second electrode located on a second surface of the electrolyte membrane, the second surface being opposite to the first surface, the second electrode including a stack of a second catalyst layer and a second diffusion layer stacked in a second direction orthogonal to the second surface, the second direction being opposite to the first direction, and having a step in an outer peripheral edge portion of the membrane electrode assembly formed by a size difference in which a planar size of the first diffusion layer is smaller than a planar size of the second diffusion layer; and
    a resin frame disposed outside the membrane electrode assembly,
    wherein a clearance between the resin frame and an outer edge surface of the first diffusion layer is filled with a filler such that the filler reaches a level in the first direction farther from the electrolyte membrane in the first direction than a lesser one of:
        an outermost height of the first diffusion layer from the electrolyte membrane in the first direction; or
        an outermost height of the resin frame from the electrolyte membrane in the first direction,
    wherein the level the filler reaches in the first direction is equal to or less than a greater one of:
        the outermost height of the first diffusion layer from the electrolyte membrane in the first direction; and
        the outermost height of the resin frame from the electrolyte membrane in the first direction,
    wherein an adhesive layer is disposed directly between a surface of the membrane electrode assembly and a surface of the resin frame in a stacking direction of the membrane electrode assembly, the adhesive layer being integrally connected to the filler, and
    wherein the resin frame includes a resin frame projection and a resin frame body, the resin frame body directly contacts an outer edge of the second diffusion layer.

2. The resin-framed membrane electrode assembly according to claim 1, wherein
    the outer edge surface of the first diffusion layer is arc shaped when viewed in a direction perpendicular to the stacking direction.

3. A resin-framed membrane electrode assembly comprising:
    a membrane electrode assembly having a sacking direction, the membrane electrode assembly comprising:
        an electrolyte membrane;
        a first electrode located on a first surface of the electrolyte membrane and including a first catalyst layer and a first diffusion layer which are stacked on the first surface in a first direction orthogonal to the first surface;
        a second electrode located on a second surface of the electrolyte membrane opposite to the first surface in the stacking direction and including a second catalyst layer and a second diffusion layer which are stacked on the second surface in a second direction orthogonal to the second surface, the second direction being opposite to the first direction, a planar size of the first diffusion layer being smaller than a planar size of the second diffusion layer; and
        a step provided at an outer peripheral edge portion of the membrane electrode assembly between the first diffusion layer and the second diffusion layer due to a size difference between the planar size of the first diffusion layer and the planar size of the second diffusion layer;
    a resin frame disposed outside the membrane electrode assembly; and
    a clearance provided between the resin frame and an outer edge surface of the first diffusion layer to be filled with a filler such that the filler reaches a level in the first direction farther from the electrolyte membrane in the first direction than a lesser one of:
        an outermost height of the first diffusion layer from the electrolyte membrane in the first direction; or
        an outermost height of the resin frame from the electrolyte membrane in the first direction,
    wherein the level the filler reaches in the first direction is equal to or less than a greater one of:
        the outermost height of the first diffusion layer from the electrolyte membrane in the first direction; and
        the outermost height of the resin frame from the electrolyte membrane in the first direction,
    wherein an adhesive layer is disposed directly between a surface of the membrane electrode assembly and a surface of the resin frame in the stacking direction, the adhesive layer being integrally connected to the filler, and
    wherein the resin frame includes a resin frame projection and a resin frame body, the resin frame body directly contacts an outer edge of the second diffusion layer.

4. The resin-framed membrane electrode assembly according to claim 3, wherein
    the outer edge surface of the first diffusion layer is arc shaped when viewed in a direction perpendicular to the stacking direction.

5. The resin-framed membrane electrode assembly according to claim 3, wherein
    the filler is filled into the clearance such that the filler is inclined upward from the outermost height of the first diffusion layer toward an outer periphery of the membrane electrode assembly in a cross section in the stacking direction.

6. The resin-framed membrane electrode assembly according to claim 4, wherein
the outer edge surface of the first diffusion layer is curved toward a center of the membrane electrode assembly in the cross section in the stacking direction when seen toward the first catalyst layer in the stacking direction.

7. The resin-framed membrane electrode assembly according to claim 1, wherein
the clearance is provided between an innermost edge surface of the resin frame and the outer edge surface of the first diffusion layer.

8. The resin-framed membrane electrode assembly according to claim 7, wherein
the filler is provided directly between the innermost edge surface of the resin frame and the outer edge surface of the first diffusion layer.

9. The resin-framed membrane electrode assembly according to claim 1, wherein
the filler has a first outermost surface in the first direction that is a first distance from the electrolyte membrane in the first direction,
the first diffusion layer has a second outermost surface in the first direction that is a second distance from the electrolyte membrane in the first direction, and
the first distance being greater than the second distance.

10. The resin-framed membrane electrode assembly according to claim 1, wherein
the filler has a first outermost surface in the first direction that is a first distance from the electrolyte membrane in the first direction,
the resin frame has a second outermost surface in the first direction that is a second distance from the electrolyte membrane in the first direction, and
the first distance being less than or equal to the second distance.

11. The resin-framed membrane electrode assembly according to claim 3, wherein
the clearance is provided between an innermost edge surface of the resin frame and the outer edge surface of the first diffusion layer.

12. The resin-framed membrane electrode assembly according to claim 11, wherein
the filler is provided directly between the innermost edge surface of the resin frame and the outer edge surface of the first diffusion layer.

13. The resin-framed membrane electrode assembly according to claim 3, wherein
the filler has a first outermost surface in the first direction that is a first distance from the electrolyte membrane in the first direction,
the first diffusion layer has a second outermost surface in the first direction that is a second distance from the electrolyte membrane in the first direction, and
the first distance being greater than the second distance.

14. The resin-framed membrane electrode assembly according to claim 3, wherein
the filler has a first outermost surface in the first direction that is a first distance from the electrolyte membrane in the first direction,
the resin frame has a second outermost surface in the first direction that is a second distance from the electrolyte membrane in the first direction, and
the first distance being less than or equal to the second distance.

15. The resin-framed membrane electrode assembly according to claim 10, wherein
the first diffusion layer has a third outermost surface in the first direction that is a third distance from the electrolyte membrane in the first direction, and
the first distance being greater than the third distance.

16. The resin-framed membrane electrode assembly according to claim 14, wherein
the first diffusion layer has a third outermost surface in the first direction that is a third distance from the electrolyte membrane in the first direction, and
the first distance being greater than the third distance.

17. The resin-framed membrane electrode assembly according to claim 1, wherein
the surface of the membrane electrode assembly and the surface of the resin frame between which the adhesive layer is disposed each extend in planes that are orthogonal to the stacking direction, and
the adhesive layer extends outwardly from the filler in relation to a center of the resin-framed membrane electrode assembly in a direction parallel to the planes that are orthogonal to the stacking direction.

18. A resin-framed membrane electrode assembly comprising:
a membrane electrode assembly including
an electrolyte membrane, a first electrode located on a first surface of the electrolyte membrane and including a stack of a first catalyst layer and a first diffusion layer stacked on the first surface in a first direction orthogonal to the first surface, and a second electrode located on a second surface of the electrolyte membrane, the second surface being opposite to the first surface, the second electrode including a stack of a second catalyst layer and a second diffusion layer stacked in a second direction orthogonal to the second surface, the second direction being opposite to the first direction, and having a step in an outer peripheral edge portion of the membrane electrode assembly formed by a size difference in which a planar size of the first diffusion layer is smaller than a planar size of the second diffusion layer; and
a resin frame disposed outside the membrane electrode assembly,
wherein a clearance between the resin frame and an outer edge surface of the first diffusion layer is filled with a filler such that the filler reaches a level in the first direction farther from the electrolyte membrane in the first direction than an outermost height of the first diffusion layer from the electrolyte membrane in the first direction,
wherein an outermost height of the filler in the first direction is less than or equal to the outermost height of the resin frame in the first direction, and
wherein the resin frame includes a resin frame projection and a resin frame body, the resin frame body directly contacts an outer edge of the second diffusion layer.

* * * * *